(12) United States Patent
Shirakawa (10) Patent No.: US 7,245,318 B2
(45) Date of Patent: Jul. 17, 2007

(54) IMAGING APPARATUS THAT CORRECTS AN IMBALANCE IN OUTPUT LEVELS OF IMAGE DATA

(75) Inventor: Yusuke Shirakawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1033 days.

(21) Appl. No.: 10/285,483

(22) Filed: Nov. 1, 2002

(65) Prior Publication Data

US 2003/0090577 A1    May 15, 2003

(30) Foreign Application Priority Data

Nov. 9, 2001   (JP)   ............... 2001-344917

(51) Int. Cl.
  H04N 5/225   (2006.01)
  H04N 5/235   (2006.01)
  H04N 5/335   (2006.01)
  G06K 9/36    (2006.01)

(52) U.S. Cl. .................. 348/218.1; 348/229.1; 348/316; 382/284

(58) Field of Classification Search ............ 348/36, 348/38, 39, 229.1, 230.1, 218.1, 266, 305, 348/316, 319, 320, 321, 322, 323; 358/540; 382/284

See application file for complete search history.

(56) References Cited

U.S. PATENT DOCUMENTS

| | | | | |
|---|---|---|---|---|
| 5,386,228 A * | 1/1995 | Okino | ..................... | 348/218.1 |
| 5,737,015 A * | 4/1998 | Juen | ..................... | 348/230.1 |
| 6,211,911 B1 * | 4/2001 | Komiya et al. | ..................... | 348/218.1 |
| 6,337,713 B1 * | 1/2002 | Sato | ..................... | 348/320 |
| 6,433,822 B1 * | 8/2002 | Clark et al. | ..................... | 348/308 |
| 6,731,338 B1 * | 5/2004 | Lin | ..................... | 348/218.1 |
| 6,768,102 B1 * | 7/2004 | Skoll | ..................... | 250/252.1 |
| 6,791,615 B1 * | 9/2004 | Shiomi et al. | ..................... | 348/323 |
| 6,804,406 B1 * | 10/2004 | Chen | ..................... | 382/294 |
| 7,019,775 B2 * | 3/2006 | Matsumoto | ..................... | 348/296 |
| 7,050,098 B2 * | 5/2006 | Shirakawa et al. | ..................... | 348/245 |
| 7,215,364 B2 * | 5/2007 | Wachtel et al. | ..................... | 348/218.1 |
| 2002/0140830 A1 * | 10/2002 | Shirakawa et al. | ..................... | 345/245 |
| 2005/0007475 A1 * | 1/2005 | Hori et al. | ..................... | 348/321 |
| 2006/0197853 A1 * | 9/2006 | Miyashita | ..................... | 348/241 |
| 2007/0098300 A1 * | 5/2007 | Komiya et al. | ..................... | 382/284 |

FOREIGN PATENT DOCUMENTS

| | | |
|---|---|---|
| JP | 3-85972 | 4/1991 |
| JP | 11-155097 | 6/1999 |

(Continued)

*Primary Examiner*—John M. Villecco
(74) *Attorney, Agent, or Firm*—Fitzpatrick, Cella, Harper & Scinto (57) ABSTRACT

In an imaging apparatus, a method of correcting image data, or a storage medium storing a program, a target is imaged in a plurality of imaging regions and image data is output from each of the plurality of imaging regions; based on the image data captured in a first imaging operation, an imbalance in output levels of image data respectively output from the plurality of imaging regions in a second imaging operation is corrected; and an imaging condition in the first imaging operation is controlled in accordance with an imaging condition in the second imaging operation. Accordingly, an imbalance in a plurality of image data simultaneously output from a plurality of output terminals of an imaging device is automatically corrected appropriately even if an imaging condition changes.

21 Claims, 5 Drawing Sheets

FOREIGN PATENT DOCUMENTS

| | | | | |
|---|---|---|---|---|
| JP | 2000-253305 | | | 9/2000 |
| JP | 2001094886 | A | * | 4/2001 |
| JP | 2002300477 | A | * | 10/2002 |
| JP | 2003174581 | A | * | 6/2003 |
| JP | 2003209739 | A | * | 7/2003 |
| JP | 2005142638 | A | * | 6/2005 |
| JP | 2005151046 | A | * | 6/2005 |

* cited by examiner

IMAGING APPARATUS THAT CORRECTS AN IMBALANCE IN OUTPUT LEVELS OF IMAGE DATA

BACKGROUND OF THE INVENTION

1. Field of the Invention

The present invention relates to a method of correcting an imbalance in an imaging device used in a digital camera or the like. More specifically, the present invention relates to a method of correcting an imbalance in an imaging device having a plurality of output terminals from which data is simultaneously read, by averaging output levels of image data respectively output from the plurality of output terminals, so that a seam will not be apparent in an image formed by combining the output data.

2. Description of the Related Art

In order to improve the ability of sequence shooting in a conventional digital camera system on the order of ten frames per second, it is required that the overall system be improved. That is, there must be an improvement of the speed of reading from the imaging device and of the speed of writing data from the imaging device to a frame memory.

Figure 1:
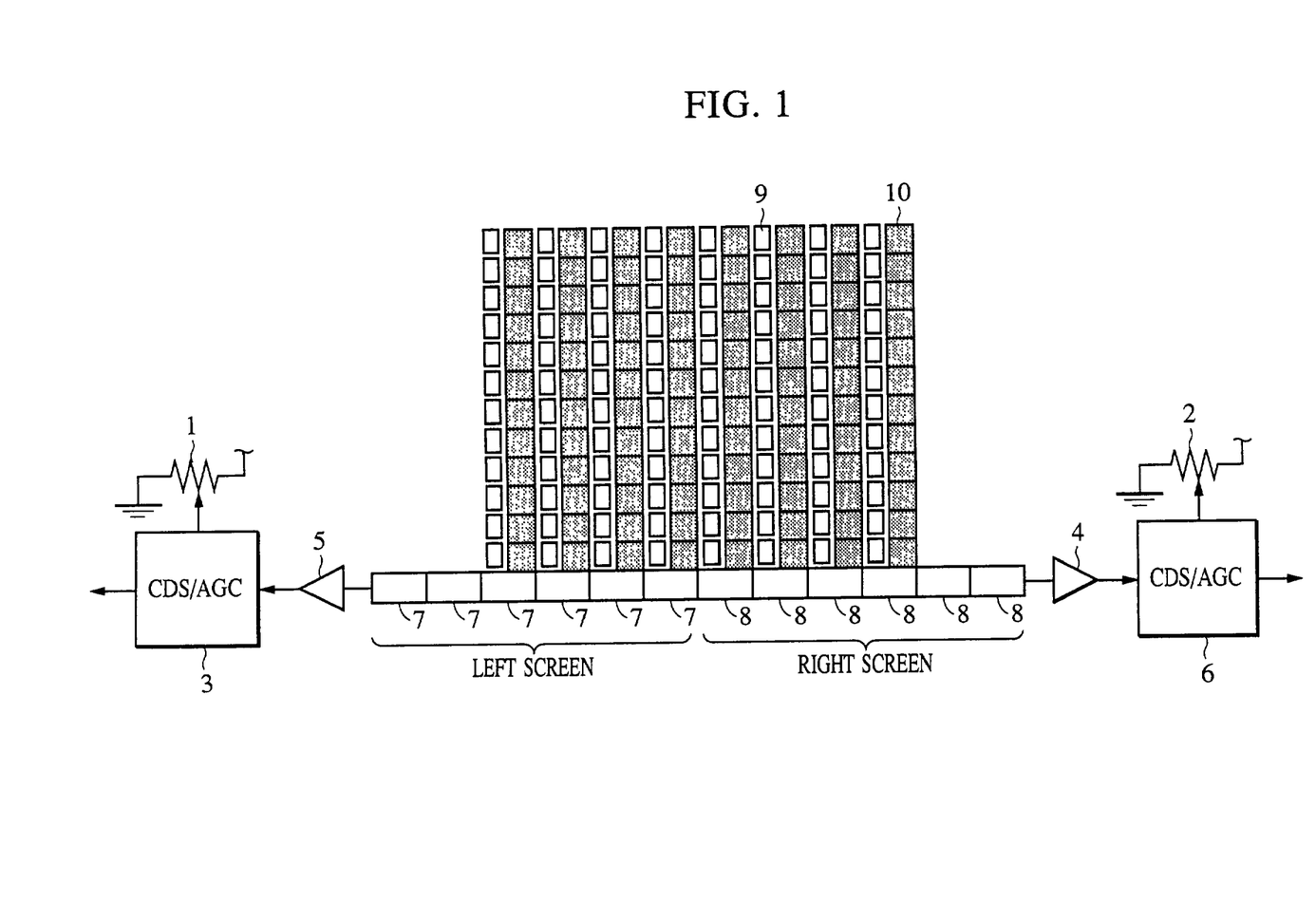
FIG. 1 is a diagram showing the construction of an imaging device that is to be used in the embodiments of the present invention.

FIG. 1 schematically shows the construction of an imaging device, more specifically a CCD with two horizontal CCD sections and two outputs, which is an example of improvement of conventional technology.

In the CCD shown in FIG. 1, charges generated by photodiodes 9 at respective pixels are simultaneously transferred to vertical CCD segments 10 at a predetermined timing, and the charges transferred to the vertical CCD segments 10 are transferred, line by line, to horizontal CCD segments 7 and 8 at a subsequent timing.

The horizontal CCD segments 7 transfer the charges that have been transferred thereto to a left amp 5 in synchronization with a transfer clock, whereas the horizontal CCD segments 8 transfer the charges that have been transferred thereto to a right amp 4 in synchronization with the transfer clock. Thus, image data captured by the CCD is read as left and right segments separated along a center of the screen.

The left and right parts of the image data captured by the CCD are respectively input to CDS/AGC circuits 3 and 6, which are grounded via resistors 1 and 2, respectively, and A/D conversion circuits 116 and 117 (shown in FIG. 2), and then stored in frame memories 126 and 127 (shown in FIG. 3) after being converted into digital data. These digital image data for the left part and for the right part are imbalanced mainly due to a difference in gain between the CDS/AGC circuits 3 and 6, particularly with regard to the offset component and the gain component. In order to correct the imbalance, calibration imaging is performed in addition to main imaging.

In an imaging apparatus such as a digital camera, in a proposed method, calibration imaging for calculating a correction coefficient for correcting an imbalance among a plurality of outputs is performed before or after the main imaging, and an imbalance among a plurality of outputs in an image obtained by main imaging is corrected using the correction coefficient. In another proposed method, the imbalance is corrected by the correlation of a plurality of outputs after converting a plurality of output signals into digital image data by an analog/digital converter.

However, some high-specification digital cameras, for example, of the single lens reflex type, allow various settings of imaging conditions, such as speed setting equivalent to ISO 100 to ISO 6400 or long-time imaging exceeding ten seconds. Thus, the correction methods described above are not sufficient for all these imaging conditions, resulting in inaccurate or unstable correction.

SUMMARY OF THE INVENTION

The present invention has been made in view of the above, and it is an object of the present invention to provide an imaging apparatus, a method of correcting image data, and a storage medium storing a program that allows an imbalance between a plurality of image data simultaneously output from a plurality of output terminals of an imaging device to be corrected automatically and appropriately.

To this end, the present invention, in one aspect thereof, provides an imaging apparatus that includes: an imaging device for imaging a target in a plurality of imaging regions and outputting the image data from each of the plurality of imaging regions; a correction device for correcting, based on image data captured in a first imaging operation, an imbalance in output levels of image data respectively output from the plurality of imaging regions in a second imaging operation; and a control device for controlling an imaging condition in the first imaging operation in accordance with an imaging condition in the second imaging operation.

The present invention, in another aspect thereof, provides a method of correcting image data obtained by an imaging apparatus, including the steps of: imaging a target in a plurality of imaging regions and outputting image data from each of the plurality of imaging regions; correcting, based on image data captured in a first imaging operation, an imbalance in output levels of image data respectively output from the plurality of imaging regions in a second imaging operation; and controlling an imaging condition in the first imaging operation in accordance with an imaging condition in the second imaging operation.

The present invention, in yet another aspect thereof, provides a storage medium storing a program for executing a method of correcting image data obtained by an imaging apparatus, the program including the steps of imaging a target in a plurality of imaging regions and outputting image data from each of the plurality of imaging regions; correcting, based on image data captured in a first imaging operation, an imbalance in output levels of image data respectively output from the plurality of imaging regions in a second imaging operation; and controlling an imaging condition in the first imaging operation in accordance with an imaging condition in the second imaging operation.

Further objects, features and advantages of the present invention will become apparent from the following description of the preferred embodiments with reference to the attached drawings.

DESCRIPTION OF THE PREFERRED EMBODIMENTS

First Embodiment

Figure 2:
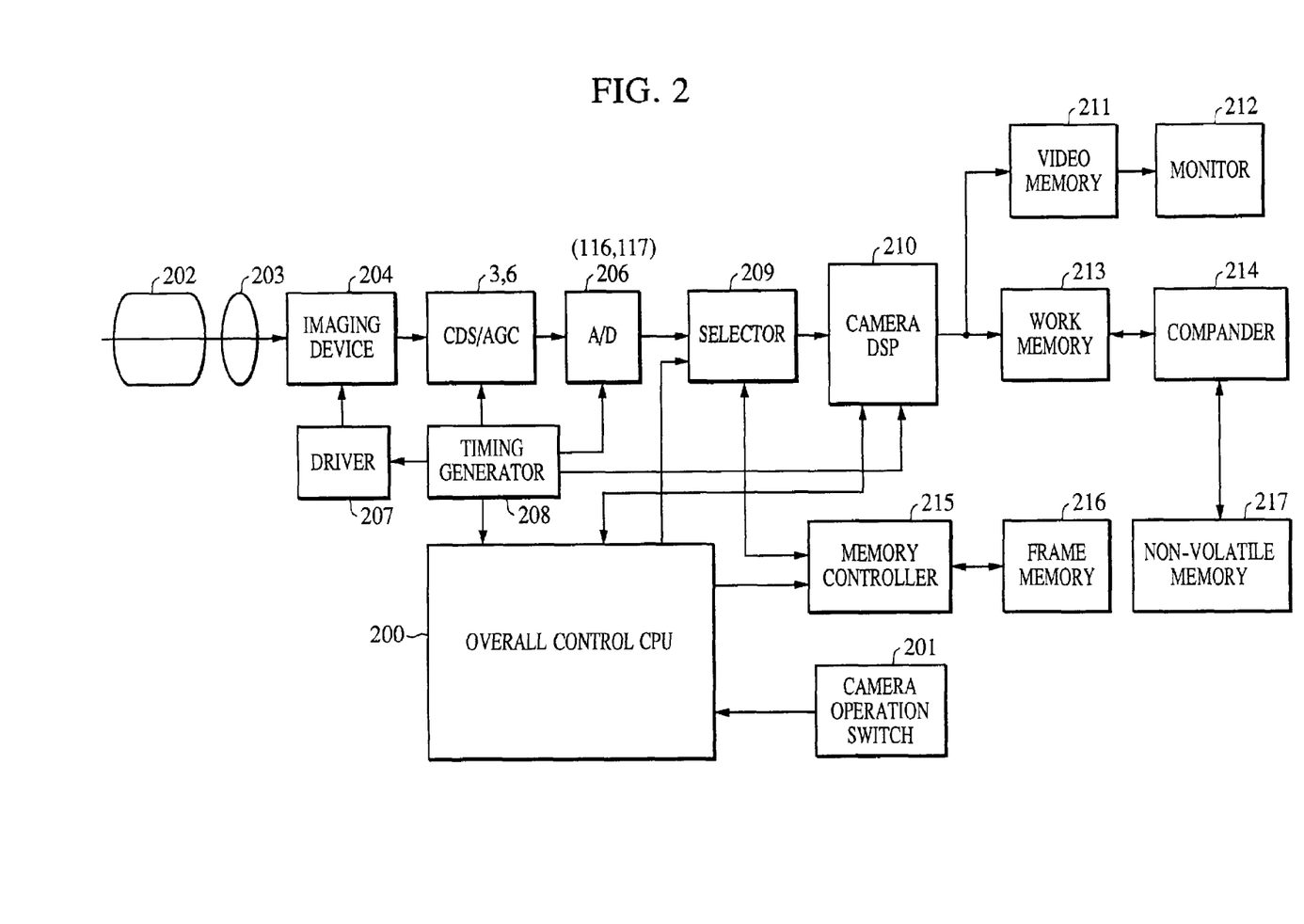
FIG. 2 is a block diagram of a digital still camera according to the embodiments of the present invention.

FIG. 2 is a block diagram of a digital still camera according to a first embodiment of the present invention. In the digital still camera, when a change in the status of a camera operation switch 201 (including a main switch, a release switch SWI, and a release switch SW2) operated by a user is detected by an overall control CPU 200, power is supplied to other circuit blocks as needed.

An image of a target within an imaging screen is formed on an imaging device 204, constructed as shown in FIG. 1, through main imaging optical systems 202 and 203. Electric signals from the imaging device 204 are transferred to CDS/AGC circuits 3 and 6, and then to an A/D conversion circuit 206, where the electric signals are sequentially converted into corresponding digital signals on a pixel-by-pixel basis.

The imaging device 204 is driven by outputs of a driver circuit 207 for horizontal driving and vertical driving on a pixel-by-pixel basis, based on a signal from a timing generator 208 that determines overall drive timing, generating output image signals.

Similarly, the CDS/AGC circuits 3 and 6 and the A/D conversion circuit 206, which process outputs from the imaging device 204 in analog form and converts them into corresponding signal levels, operate based on timing signals from the timing generator 208.

Outputs from the A/D conversion circuit 206 are input to a memory controller 215 via a selector 209 that selects a signal based on a signal from the overall control CPU 200, and the memory controller 215 transfers all signal outputs to a frame memory 216. Thus, in this case, pixel data of each frame of image is all stored temporarily in the frame memory 216, so that data of a sequence shoot is all written to the frame memory 216.

When the imaging operation is complete, under the control of the memory controller 215, the content of the image data stored in the frame memory 216 is transferred to a camera DSP 210 via the selector 209. The camera DSP 210 generates signals of RGB color components based on pixel data of the image data transferred from the frame memory 216.

Usually, before the imaging operation, the results are regularly (on a frame-by-frame basis) transferred to a video memory 211 and displayed, for example, through a monitor 212.

When a user executes an imaging operation by operating the camera operation switch 201, pixel data of one frame is read from the frame memory 216 according to a control signal from the overall control CPU 200, and is then temporarily stored in a work memory 213 after undergoing image processing by the camera DSP 210.

Then, the data in the work memory 213 is compressed by a compander circuit 214 according to a predetermined format, and the result is stored in an external non-volatile memory 217 (typically a flash memory).

When image data that has been captured is to be viewed, data stored in the external memory 217 in compressed form is expanded by the compander circuit 214 into normal image data on a pixel-by-pixel basis, and the result is transferred to the video memory 211, whereby the image data can be viewed through the monitor 212.

As described above, in the typical digital camera, output from the imaging device 204 is converted into actual image data by a processing circuit substantially in real time, and the result is output to a memory or monitor circuit.

Figure 3:
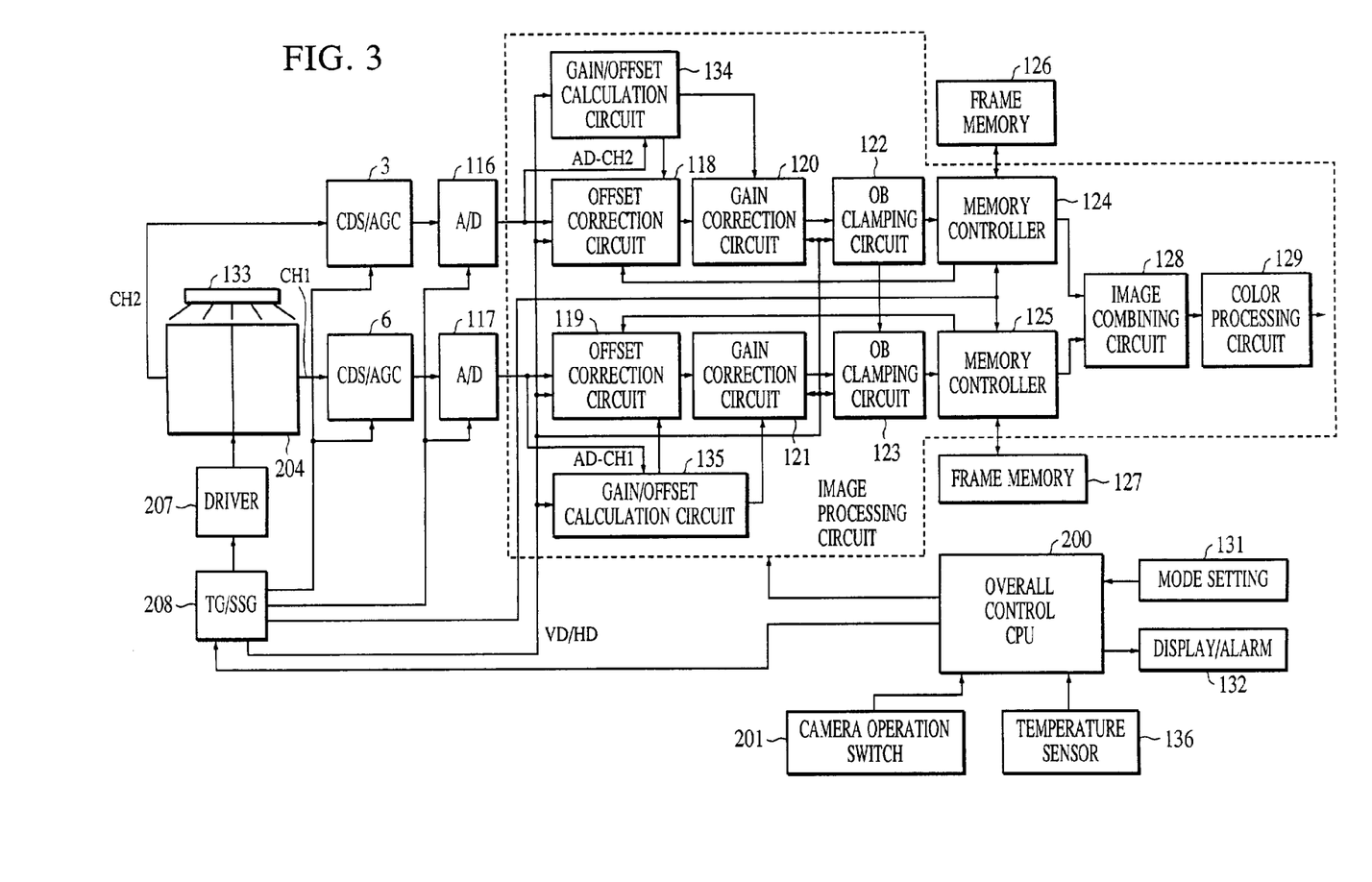
FIG. 3 is a detailed diagram showing an image processing section of the digital still camera according to the embodiments of the present invention.

FIG. 3 is a detailed block diagram of a circuit for processing a signal output from an imaging device of the type shown in FIG. 1.

Referring to FIG. 3, a CCD 204, having two outputs CH1 and CH2, is driven by a driver 207 and operates at a predetermined frequency, outputting image data separately for left and right halves of the screen. An image of a target is formed on the CCD 204 by a main optical system not shown, and photoelectric conversion takes place at photodiodes in the CCD 204. Electric signals thus generated are transferred vertically to horizontal CCD segments (hereinafter referred to as HCCDs) through vertical CCDs (hereinafter referred to as VCCDs), and then transferred horizontally through the HCCDs to output amps. A TG/SSG circuit 208 is a timing generating circuit for outputting a vertical synchronization signal VD and a horizontal synchronization signal HD, and it also supplies a timing signal to each circuit block. Output of the right half of the CCD 204 is input to the CDS/AGC circuit 6 via the output CH1, is cleared of reset noise, etc. by, for example, correlated double sampling, and is then converted into digital data by an A/D conversion circuit 117. Similarly, output of the left half of the CCD 204 is input to the CDS/AGC circuit 3, is cleared of reset noise, etc. by, for example, correlated double sampling, and is then converted into digital data by the A/D conversion circuit 116.

The image data for the right half and the left half, having been converted into digital data, are input to an image processing circuit (circuits subsequent to the A/D conversion circuit 206 in FIG. 2), are combined into a single image by an image combining circuit 128, and color-processed by a color processing circuit 129. Again, the amount of difference in gain and offset between the right and left screens is perceived due to the imbalance in the right and left outputs if the image data are combined without special process. In this embodiment, the amount of imbalance between the right and left outputs is obtained by calibration imaging, and the imbalance between the right and left image data obtained by main imaging is corrected accordingly.

The calibration imaging is performed with appropriate exposure with a photoreceptive surface of the CCD 204 uniformly illuminated by an illuminating apparatus 133. The amounts of difference in the gain and offset between the right and left screens in the image data are calculated by the gain/offset calculation circuits 134 and 135, thereby determining the amount of the imbalance. The amount of the imbalance is assumed to gradually change as time passes, temperature changes, etc.; however, no perceptive change will occur in a certain period, so that the imbalance can be corrected based on the amounts of difference in the gain/offset if main imaging is executed within the period. Thus, calibration imaging is desirably executed regularly within each period. In the description, "correction of imbalance based on the amounts of difference" means that data for correcting a difference is calculated and correction is performed based on the data.

Figure 4:
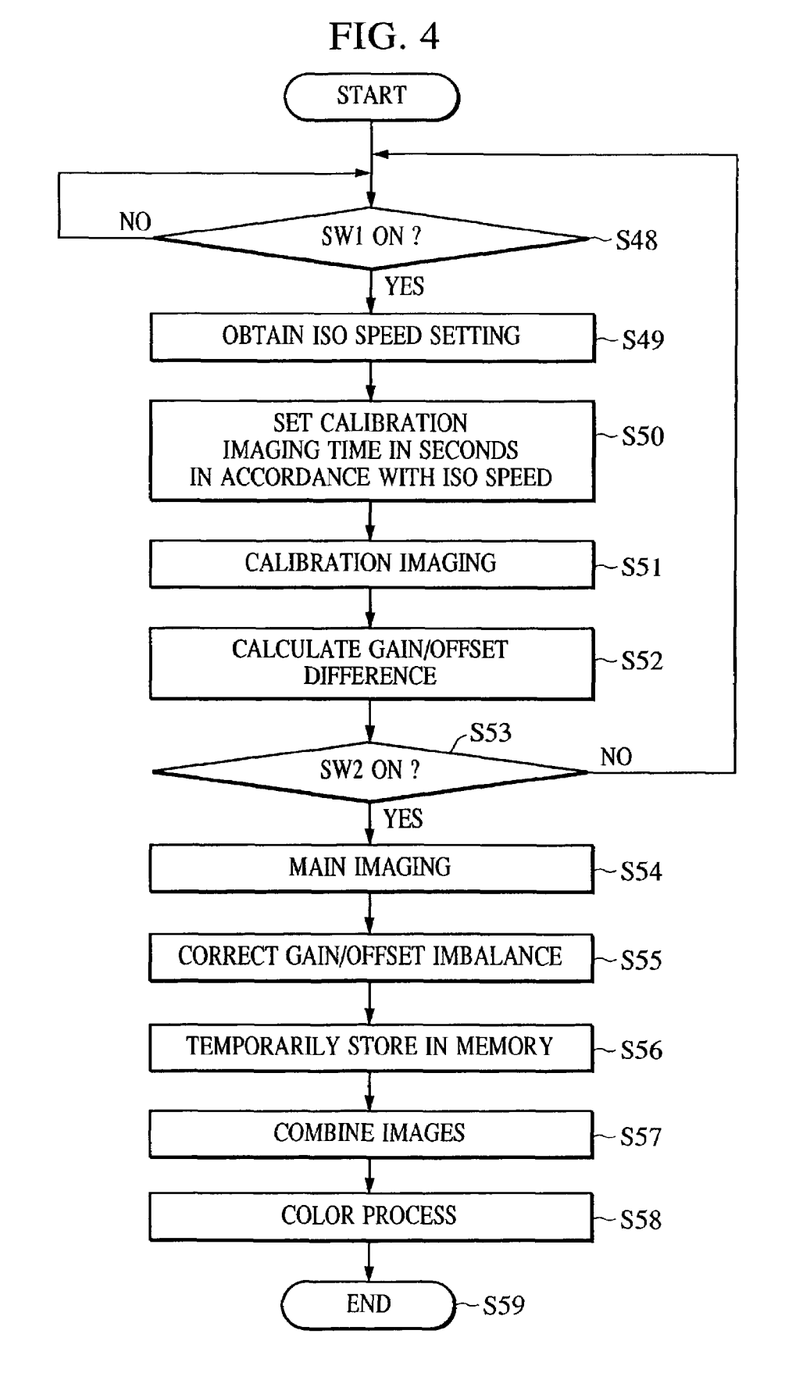
FIG. 4 is a flowchart showing an operation procedure of the digital still camera according to a first embodiment of the present invention.

In calibration imaging, it is desired that exposure be stable in order to accurately calculate the amount of the imbalance. However, if the ISO speed (imaging sensitivity) setting of the camera is changed, that is, if the gains of the CDS/AGC circuits 3 and 6 are changed, exposure changes if imaging time (exposure time), etc. in calibration imaging is maintained the same, possibly exceeding the permitted range of the A/D conversion circuits 116 and 117. Description will be made with reference to a flowchart in FIG. 4, showing an operation procedure of the CPU 200, to demonstrate that the above problem is overcome in the imaging apparatus according to this embodiment.

First, half-pressed status (SWI) of the camera operation switch 201 is detected (step S48). Then, information regarding ISO speed (imaging sensitivity) setting is obtained prior to calibration imaging (step S49). Then, an imaging condition in calibration imaging is changed in accordance with the ISO speed setting so that DC outputs of the A/D conversion circuits 116 and 117 will always be substantially the same (step S50). In step S50, for example, exposure time is made shorter in calibration imaging if the ISO speed is high while exposure time is made longer if the ISO speed is low, changing shutter control time so that output levels of images output from the A/D conversion circuits 116 and 117 will be constant. Alternatively, output levels of images may be maintained constant by controlling illumination by the illuminating apparatus 133. ISO speed setting is not to be changed between calibration imaging and main imaging (imaging for recording captured image data). Thus, by correcting the imbalance differently in accordance with ISO speed setting, the imbalance is appropriately corrected with any ISO speed setting.

Then, calibration imaging is performed (step S51). Then, the difference in offset and the difference in gain are obtained from the left and right image data captured by the calibration imaging (step S52). Then, fully pressed status (SW2) of the camera operation switch 201 is detected (step S53). When the fully pressed status is detected, main imaging is executed with the same ISO speed setting (step S54). Then, the difference in offset and the difference in gain, obtained by the calibration imaging, are set in the offset correction circuits 118 and 119 and the gain correction circuits 120 and 121, respectively, and the imbalance between the left and right image data is corrected so that the average output levels of the left and right image data of the image obtained by main imaging will be the same (step S55). This process generates a signal that does not allow perception of a border when the left and right images are combined. Then, OB (optical black) clamping is executed in OB clamping circuits 122 and 123. If OB clamping is executed separately for the left and right outputs, the imbalance that has been corrected is again caused. Accordingly, OB clamping is executed for the left and right outputs using the same value of an OB pixel portion of either the left image or the right image. Then, the image data are temporarily stored in the frame memories 126 and 127 via the memory controllers 124 and 125 (step S56). The left and right images are processed in parallel at a fast speed from imaging to temporary storage in memory, which serves to achieve a high ability of sequence shoot.

At a timing such as when a sequence shoot is complete or when the frame memories 126 and 127 are full, images are retrieved one by one from the frame memories 126 and 127, and image data that has been separated between left and right images are combined into a single image by the image combining circuit 128 (step S57). Furthermore, a predetermined color process (color interpolation process, gamma transformation process, etc.) is executed (step S58).

As described above, according to this embodiment, imaging time in calibration imaging is changed in accordance with ISO speed setting. Accordingly, the imbalance among a plurality of image data simultaneously output from a plurality of output terminals of an imaging device is corrected automatically and appropriately, serving to obtain an image without an unnatural difference in level.

Second Embodiment

Figure 5:
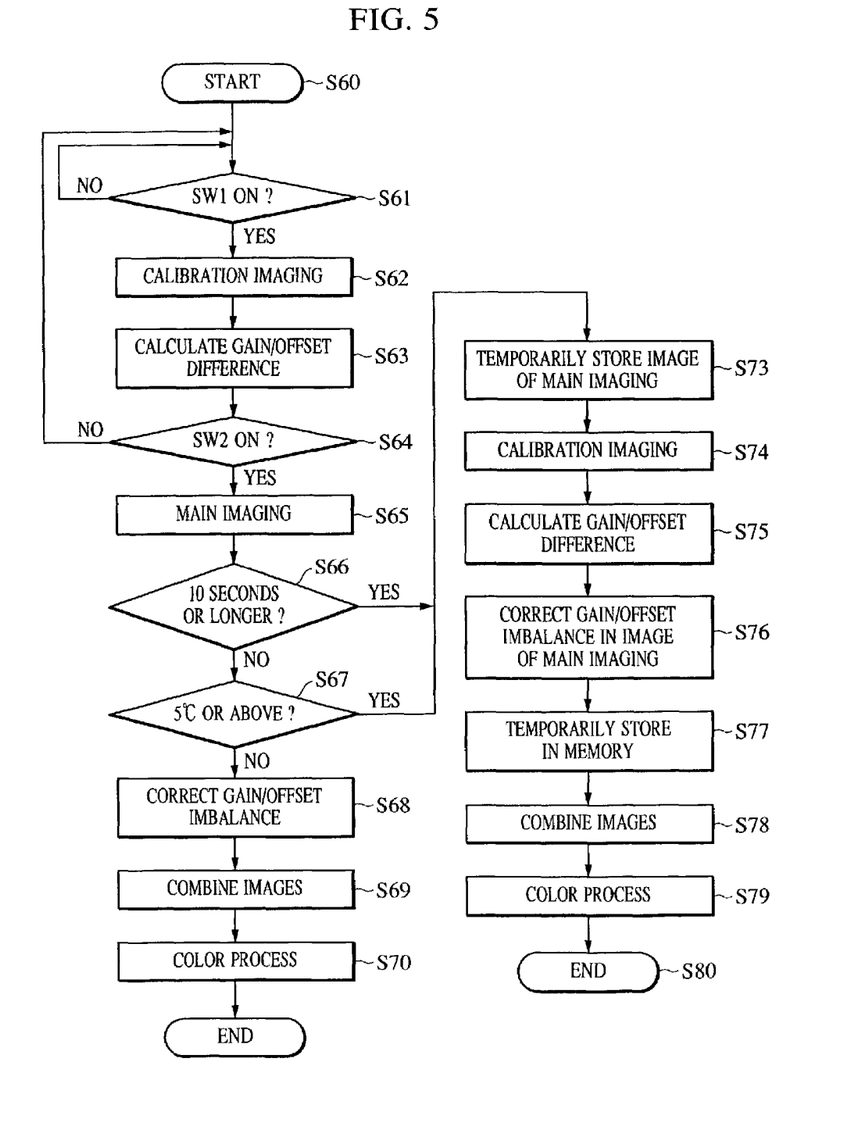
FIG. 5 is a flowchart showing an operation procedure of the digital still camera according to a second embodiment of the present invention.

FIG. 5 is a flowchart showing a procedure of an imaging operation by an imaging apparatus according to a second embodiment of the present invention. The hardware configuration of the second embodiment is the same as that of the first embodiment.

The amount of imbalance in signals simultaneously read from a plurality of output terminals of an imaging device is considered to change based on a time or temperature difference between calibration imaging and main imaging. Thus, correction of imbalance in a plurality of outputs based on calibration imaging, according to the first embodiment, could fail to work appropriately if the time interval or temperature difference between calibration imaging and main imaging is large. The time interval can be maintained short to a certain extent by regularly performing calibration imaging. However, in a high-performance digital camera, for example, of the single lens reflex type, long-time imaging exceeding ten seconds must be assumed. In that case, if calibration imaging is performed prior to main imaging, although the time interval between calibration imaging and the start of exposure can be maintained short, the time interval to the end of exposure in main imaging, at which time the image is actually transferred, becomes longer for the length of exposure time, so that the amount of imbalance obtained by calibration imaging might change during the time interval. Considering the imaging response of the camera and ease of image processing in the case of a sequence shoot, calibration imaging prior to main imaging, compared with calibration imaging subsequent to main imaging, is advantageous in that the amount of imbalance to be corrected is determined at the time of main imaging; however, it will be obviously disadvantageous with regard to the image quality if the accuracy of correction is degraded due to a change in the amount of the imbalance. Thus, in some cases, the accuracy of correction must be emphasized at the cost of imaging response.

Even if the time difference between calibration imaging and main imaging is short, in some cases, the temperature difference between calibration imaging and main imaging is large, for example, when sequence shooting is continuously performed. Also, in this case, the accuracy of correction based on calibration imaging could be degraded, which is disadvantageous with regard to image quality.

As described above, when long-time imaging is performed or if the temperature difference between main imaging and calibration imaging is large, calibration imaging is performed after main imaging, so that the timing of reading an image of main imaging and the timing of reading an image of calibration imaging are close in time to each other. Accordingly, a change in the amount of imbalance between the left and right images due to elapse of time or temperature change is suppressed, serving to improve the accuracy of correcting the imbalance.

The second embodiment is an example of correcting an imbalance differently when there is a time or temperature difference between calibration imaging and main imaging.

Referring to FIG. 5, first, a half pressed status (SW1) of the camera operation switch 201 is detected, the switch SW1 is activated (step S61) and calibration imaging is performed (step 62). Then, a difference in offset and gain are obtained from the left and right image data captured by the calibration imaging (step S63). Furthermore, fully pressed status (SW2) of the camera operation switch 201 is detected (step S64). When fully pressed status is detected, main imaging (imaging for recording captured image data) is performed (step S65). Then, in steps S66 and S67, the time interval from calibration imaging to main imaging and the temperature difference between calibration imaging and main imaging are checked.

If the time interval between calibration imaging and main imaging is shorter than ten seconds and if the temperature difference between calibration imaging and main imaging is smaller than 5° C. (i.e., if both steps S66 and S67 evaluate to "No"), the procedure proceeds to step S68, in which the amounts of difference in the gain and offset obtained by calibration imaging prior to main imaging are set in the offset correction circuits 118 and 119 and the gain correction circuits 120 and 121, respectively, so that image data obtained by main imaging is corrected with regard to the offset in the offset correction circuits 118 and 119 and is corrected with regard to gain in the gain correction circuits 120 and 121 (step S68). Accordingly, image data is corrected so that a border between the left and right images will not be apparent in a combined image formed of the left and right images separately read from the imaging device shown in FIG. 1 (steps S69 and S70).

When the time interval between the calibration imaging executed in response to the activation of the switch SW1 and main imaging executed in response to activation of the switch SW2 is longer than ten seconds (or five seconds, one second, or other length of time depending on the system) (i.e., if step S66 evaluates to "Yes"), or if the difference in temperature of the CCD 204 measured by a temperature sensor 136 (shown in FIG. 3) at the time of calibration imaging and main imaging is larger than 5° C. (or 1° C., 3° C., or another temperature depending on the system) (i.e., if step S67 evaluates to "Yes"), the amount of difference in the gain and offset obtained by calibration imaging prior to main imaging are disregarded, and the initial values of the amounts of difference in offset and gain are set in the offset correction circuits 118 and 119 and the gain correction circuits 120 and 121, respectively. Desirably, the initial values are selected so that the data is not corrected, for example, such that the amount of difference in the offset is zero and the amount of difference in the gain is one.

Referring again to FIG. 5, the procedure proceeds to step S73, in which the left and right images obtained by main imaging are temporarily stored in the frame memories 126 and 127, respectively. Then, the offset and gain are corrected in the offset correction circuits 118 and 119 and the gain correction circuits 120 and 121 based on the initial values, and the corrected image data are temporarily stored in the frame memories 126 and 127 via the memory controllers 124 and 125. Then, calibration imaging is re-executed as soon as main imaging in step S65 is completed (step S74).

In calibration imaging, luminance and exposure time of the illuminating apparatus 133 are suitably selected so that the exposure time is sufficiently shorter as compared with main imaging. Thus, the time interval between the timing of reading data of main imaging calibration imaging is short, so that sufficient accuracy for correcting an imbalance is achieved. The amounts of difference in gain and offset, obtained by calibration imaging, are set in the offset correction circuits 118 and 119 and the gain correction circuits 120 and 121 (step S75). Then, the image data temporarily stored in the frame memories 126 and 127 are again input to the offset correction circuits 118 and 119 via the memory controllers 124 and 125, respectively. The difference in offset is corrected in the offset correction circuits 118 and 119 and the difference in gain is corrected in the gain correction circuits 120 and 121 so that a border will not be apparent in a combined image formed of the left and right images (step S76). The left and right images that have been corrected are again temporarily stored, and OB clamping is executed in the OB clamping circuits 122 and 123 (step S77). If OB clamping is executed separately for the left and right images, the imbalance that has been corrected is again caused. Thus, the left and right outputs are clamped using the same value of an OB pixel portion of either the left half or the right half. Then, the image data is input to the image combining circuit 128 via the memory controllers 124 and 125, in which the left and right image data are combined into a single image (step S78). Furthermore, a predetermined color process (color interpolation process, gamma transformation process, etc.) is performed in the color processing circuit 147 (step S79).

As described above, the method of correcting the imbalance is changed in accordance with imaging time such that the amount of imbalance to be corrected is calculated by calibration imaging prior to main imaging if imaging time is short while the amount of imbalance to be corrected is calculated by calibration imaging after main imaging if imaging time is long. Accordingly, the imbalance is corrected appropriately without degrading operability when imaging time is short, and the imbalance is also corrected appropriately when the imaging time is long. In this method, although operational restriction is imposed in long-time imaging, such as a delay in capturing a next frame, the restriction is perceptively insignificant assuming that the exposure time of calibration imaging is sufficiently shorter than that of main imaging.

As described above, if the temperature difference between main imaging and calibration imaging prior to the main imaging is large, calibration imaging is performed again immediately after the main imaging, so that the imbalance is corrected appropriately even if the temperature change is large.

As described hereinabove, according to the first and second embodiments, an imbalance among a plurality of image data simultaneously output from a plurality of output terminals of an imaging device is corrected automatically and appropriately even if an imaging condition changes, serving to obtain an image without an unnatural difference in level.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An imaging apparatus for compensating for a change in the amount of imbalance in signals simultaneously read from a plurality of imaging regions of a target comprising:

an image device adapted to image the target in the plurality of imaging regions and output image data from each of the plurality of imaging regions;

a correction device adapted to correct, based on image data captured in a first imaging operation, an imbalance in output levels of image data respectively output from the plurality of imaging regions in a second imaging operation; and a control device adapted to compensate for a change in the imbalance in output levels of image data respectively output from the plurality of imaging regions that occurs between the first imaging operation and the second imaging operation before said correction device corrects the imbalance in output levels of image data respectively output from the plurality of imaging regions in the second imaging operation.

2. The imaging apparatus according to claim 1, wherein the first imaging operation is performed with the plurality of imaging regions illuminated by an illuminating apparatus.

3. The imaging apparatus according to claim 1, wherein said control device executes the first imaging operation after the completion of the second imaging operation in accordance with an imaging condition in the second imaging operation.

4. The imaging apparatus according to claim 1, wherein the imaging condition in the first imaging operation comprises at least one of temperature, and time from the first imaging operation to the second imaging operation.

5. The imaging apparatus according to claim 1, wherein said control device re-executes the first imaging operation when a change in an imaging condition is detected between the first imaging operation and the second imaging operation.

6. The imaging apparatus according to claim 1, wherein said control device re-executes the first imaging operation when a predetermined time has elapsed since the completion of the first imaging operation.

7. The imaging apparatus according to claim 1, wherein said control device re-executes the first imaging operation if a difference in temperature between the first and second imaging operations is equal to or greater than a predetermined value.

8. A method of compensating for a change in the amount of imbalance in signals simultaneously read from a plurality of imaging regions of a target, comprising the steps of:
    imaging the target in the plurality of imaging regions and outputting image data from each of the plurality of imaging regions;
    correcting, based on image data captured in a first imaging operation, an imbalance in output levels of image data output from the plurality of imaging regions in a second imaging operation; and
    compensating for a change in the imbalance in output levels of image data respectively output from the plurality of imaging regions that occurs between the first imaging operation and the second imaging operation before said correcting step corrects the imbalance in output levels of image data respectively output from the plurality of imaging regions in the second imaging operation.

9. The method of correcting image data according to claim 8, wherein the first imaging operation is performed with the plurality of imaging regions illuminated by an illuminating apparatus.

10. The method of correcting image data according to claim 8, wherein the first imaging operation is executed after the completion of the second imaging operation in accordance with an imaging condition in the second imaging operation.

11. The method of correcting image data according to claim 8, wherein the imaging condition in the first imaging operation comprises at least one of temperature, imaging sensitivity, and time from the first imaging operation to the second imaging operation.

12. The method of correcting image data according to claim 8, wherein the first imaging operation is re-executed when a change in an imaging condition is detected between the first imaging operation and the second imaging operation.

13. The method of correcting image data according to claim 8, wherein the first imaging operation is re-executed when a predetermined time has elapsed since the completion of the first imaging operation.

14. The method of correcting image data according to claim 8, wherein the first imaging operation is re-executed if a difference in temperature between the first and second imaging operations is equal to or greater than a predetermined value.

15. A computer-readable storage medium storing a program for executing a method of compensating for a change in the amount of imbalance in signals simultaneously read from a plurality of imaging regions of a target, the program comprising the steps of:
    imaging the target in the plurality of imaging regions and outputting image data from each of the plurality of imaging regions;
    collecting, based on image data captured in a first imaging operation, an imbalance in output levels of image data output from the plurality of imaging regions in a second imaging operation; and
    compensating for a change in the imbalance in output levels of image data respectively output from the plurality of imaging regions that occurs between the first imaging operation and the second imaging operation before said correcting step corrects the imbalance in output levels of image data respectively output from the plurality of imaging regions in the second imaging operation.

16. The computer-readable storage medium according to claim 15, wherein the first imaging operation is performed with the plurality of imaging regions uniformly illuminated by an illuminating apparatus.

17. The computer-readable storage medium according to claim 15, wherein the first imaging operation is executed after the completion of the second imaging operation in accordance with an imaging condition in the second imaging operation.

18. The computer-readable storage medium according to claim 15, wherein the imaging condition in the first imaging operation comprises at least one of temperature, imaging sensitivity, and time from the first imaging operation to the second imaging operation.

19. The computer-readable storage medium according to claim 15, wherein the first imaging operation is re-executed when a change in an imaging condition is detected between the first imaging operation and the second imaging operation.

20. The computer-readable storage medium according to claim 15, wherein the first imaging operation is re-executed when a predetermined time has elapsed since the completion of the first imaging operation.

21. The computer-readable storage medium according to claim 15, wherein the first imaging operation is re-executed if difference in temperature between the first and second imaging operations is equal to or greater than a predetermined value.

* * * * *

UNITED STATES PATENT AND TRADEMARK OFFICE
CERTIFICATE OF CORRECTION

| | |
|---|---|
| PATENT NO. | : 7,245,318 B2 |
| APPLICATION NO. | : 10/285483 |
| DATED | : July 17, 2007 |
| INVENTOR(S) | : Yusuke Shirakawa |

Page 1 of 1

It is certified that error appears in the above-identified patent and that said Letters Patent is hereby corrected as shown below:

<u>COLUMN 6</u>:

Line 62, "(step 62)." should read --(step S62).--.

<u>COLUMN 10</u>:

Line 22, "collecting," should read --correcting,--.

Signed and Sealed this

Sixteenth Day of September, 2008

JON W. DUDAS
*Director of the United States Patent and Trademark Office*